United States Patent [19]

Kamata

[11] Patent Number: 4,576,446

[45] Date of Patent: Mar. 18, 1986

[54] ZOOM LENS MOUNTING

[75] Inventor: Shigeru Kamata, Tokyo, Japan

[73] Assignee: Canon Kabushiki Kaisha, Tokyo, Japan

[21] Appl. No.: 638,742

[22] Filed: Aug. 8, 1984

[30] Foreign Application Priority Data

Aug. 16, 1983 [JP] Japan ................... 58-148788

[51] Int. Cl.[4] .................. G02B 7/10; G02B 11/08
[52] U.S. Cl. ........................... 350/429; 350/255
[58] Field of Search ..................... 350/429, 255

[56] References Cited

U.S. PATENT DOCUMENTS 4,193,667 3/1980 Yasukuni et al. ............. 350/429
4,281,907 8/1981 Kamata ....................... 350/429

FOREIGN PATENT DOCUMENTS 54-23555 2/1979 Japan .
56-22167 5/1981 Japan .
56-67814 6/1981 Japan .

*Primary Examiner*—John K. Corbin
*Assistant Examiner*—Loha Ben
*Attorney, Agent, or Firm*—Toren, McGeady, Stanger, Goldberg & Kiel

[57] ABSTRACT

A zoom lens mounting with a stop having a prescribed inner diameter to shut off harmful light and arranged in a lens system to move axially in a relation that is differential to the movable lens components for zooming in a region of the zooming range, wherein a camming slot for controlling the axial movement of the stop is provided in the form of an extended portion of the camming slot for controlling the axial movement of one of the zoom components.

3 Claims, 8 Drawing Figures

ZOOM LENS MOUNTING

BACKGROUND OF THE INVENTION

1. Field of the Invention:

This invention relates to zoom lens mountings and more particularly to zoom lens mountings with a stop having a prescribed inner diameter to shut off harmful light and arranged in a lens system to move axially in a relation that is differential to the lens components axially movable for zooming in a part of the zooming range.

2. Description of the Prior Art

From the past, the zoom lens design has had a difficult problem of removing the comatic aberration resulting from the excess of the marginal light amount. Particularly in recent years the concave and convex or two component type has found its use in wide angle zoom lenses. In this type zoom lens, because its front lens component is strongly diverging, the off-axis light bundle arriving at the middle zone of the image format becomes so excessive that it is very difficult to remove the comatic aberration, and the slope of lowering the illumination at the image plane becomes very steep, intensifying the drop of the corner illumination.

As the means for eliminating the above-described drawbacks, there is presently known a harmful light shutting stop arranged in three different ways: (I) It moves as a unit with either one of the front and rear lens components; (II) It moves in differential relation to any of the front and rear lens components; and (III) It is positioned in a space within a lens component which remains stationary during zooming. Among these, the second way (II) has the greatest harmful light shutting effect and is disclosed, for example, in Japanese Laid-Open Patent Application No. SHO 54-23555. But in addition to the cam means for controlling the movement of the front and rear lens components there is need to employ another separate cam means for controlling the movement of the stop. The space the second cam means occupies has been a barrier to promoting minimization of the bulk and size of, and a reduction of the weight of, the zoom lens.

Also, the third way (III) is disclosed in Japanese Laid-Open Patent Application No. SHO 56-67814 where the stop is positioned in a space between the front and rear lens components and remains stationary relative to the lens mount surface, whereby the use of the cam means for the stop is no longer necessary. But the stop position is limited to a point just in front of the rear lens component when in the telephoto end. When zoomed to the wide angle end, the stop takes its position as deviated from the optimum point toward the front lens component. In order to admit a sufficient light bundle to arrive at the margin of the image format when in the wide angle end, the diameter of the stop must be increased. Thus, to obtain a sufficient effect becomes difficult.

Further, as the light shielding device of the zoom lens mounting the technique of Japanese Utility Model Publication No. SHO 56-22167 is known.

Said device has a light shielding member arranged ahead of the zoom lens optical system to move axially during zooming, wherein the cam for controlling the movement of the light shielding member is provided on the common sleeve of the cams for controlling the movements of the zoom lens components but in separation from the latter.

SUMMARY OF THE INVENTION

An object of the present invention is to eliminate the above-described drawbacks of the conventional one and to provide a zoom lens mounting in which the conventional movable lens control camming slot is extended to additionally provide a camming slot of different locus for controlling the movement of the stop, whereby the harmful light can be shut off in all the range from the wide angle to the telephoto end.

In particular, the present invention is to provide a zoom lens mounting provided with the aforesaid harmful light shutting stop, wherein the operating mechanism for moving the shutter stop axially as zooming is performed is comprised of an axially elongated cam and a cam follower position control cam which are formed as extended from the respective zoom lens component control cams with an advantage that the structure of the cam members can be simplified.

Another object of the present invention is to provide a mounting for a zoom lens, said zoom lens including three or more groups of optical members movable for zooming, wherein a plurality of optical members are moved by one cam portion of a cam sleeve.

Further objects and features of the present invention will be apparent from the following detailed description of preferred embodiments thereof with reference to the accompanying drawings.

BRIEF DESCRIPTION OF THE DRAWINGS

FIG. 1 is a schematic diagram illustrating the loci of movement of the various components of a zoom lens.

FIG. 2 is a sectional view of a mechanical mounting for the zoom lens.

FIGS. 3 and 4 are expanded views of the cam sleeve of FIG. 2.

FIG. 5 is a schematic diagram of the loci of movement of three components constituting a zoom lens.

FIG. 6 is a sectional view of a mechanical mounting for the zoom lens.

FIGS. 7 and 8 are expanded views of the cam sleeve.

DETAILED DESCRIPTION OF THE PREFERRED EMBODIMENT

The present invention will next be described in connection with the embodiments thereof by reference to the drawings.

Figure 1:
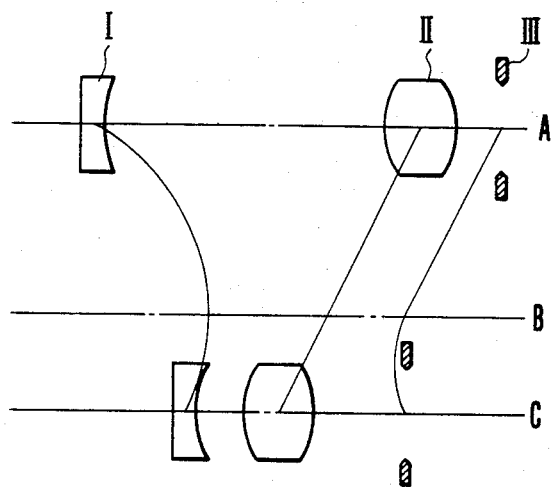
FIGS. 1 to 4 illustrate an embodiment of the present invention.

In FIG. 1, there are schematically shown the paths of movement of front and rear lens components I and II and a stop III with their positions for the focal lengths of the wide angle end, intermediate, and telephoto end indicated at A, B and C respectively.

Figure 2:
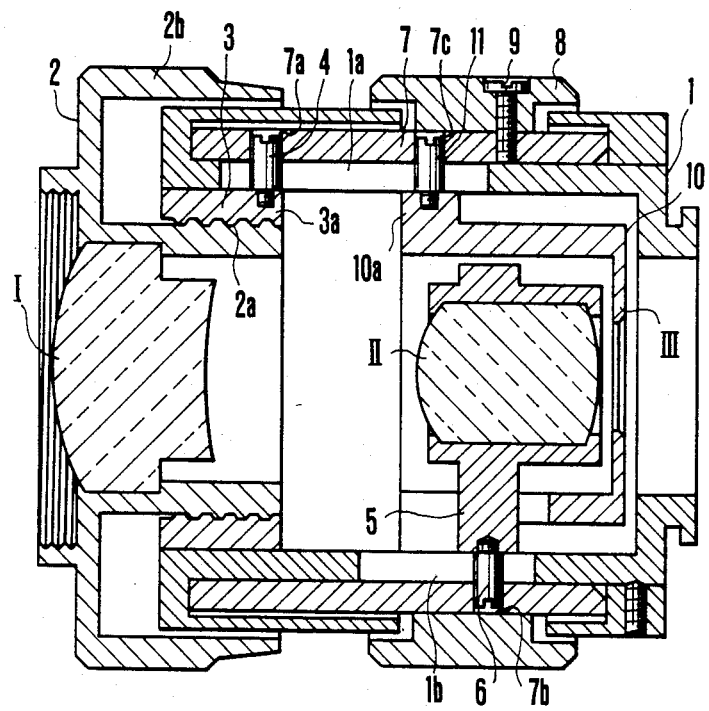

In FIG. 2, 1 is a body tube with a mount or adapter for coupling with a camera body (not shown) at the rear end thereof. The body tube 1 has axially elongated guide slots 1a and 1b.

2 is a focusing sleeve containing the front lens component I. Formed in an outer periphery of the rear half of the focusing sleeve 2 is a helicoid thread 2a meshing with another helicoid thread 3a formed in an inner periphery of a front component moving ring 3. A focusing actuator portion 2b extends rearwardly of the outer periphery of the flange at the front end of the focusing sleeve 2. When the focusing sleeve 2 is turned by grasping the actuator portion 2b, the front lens component I is axially moved to effect focusing.

The aforesaid front component moving ring 3 is movably fitted in the inner diameter of the aforesaid body tube 1. A guide pin 4 provided on the outer periphery of the ring 3 penetrates the aforesaid guide slot 1a and is axially movable. Its inner surface is, as has been described above, provided with the helicoid thread 3a.

5 is a rear component moving ring holding the rear lens component II. A guide pin 6 provided on the outer periphery of the ring 5 penetrates the aforesaid guide slot 1b of the body tube 1. The ring 5 is axially movably fitted in the inner diameter of the body tube 1.

7 is a cam sleeve rotatably fitted on the outer diameter of the aforesaid body tube 1, and having camming slots 7a and 7b for controlling the movements of the front lens component I and the rear lens component II as the aforesaid guide pins 4 and 6 extend into the camming slots 7a and 7b respectively.

8 is a zoom ring fixedly secured to the outer periphery of the aforesaid cam sleeve 7 by a fastener screw 9. When this is turned, zooming is effected.

10 is a movable stop sleeve fitted in the inner diameter of the aforesaid body tube 1, positioned in the rear of the aforesaid rear component moving ring 5 having a stop portion III of a prescribed inner diameter to shut off harmful light, and having a leg portion 10a forwardly extended through a cutout of said rear component moving ring 5. A guide pin 11 provided on said leg portion 10a penetrates the aforesaid guide slot 1a of the body tube 1 and fits in a camming slot 7c for the movable stop which slot is an extended portion of the camming slot 7b.

Figure 3:
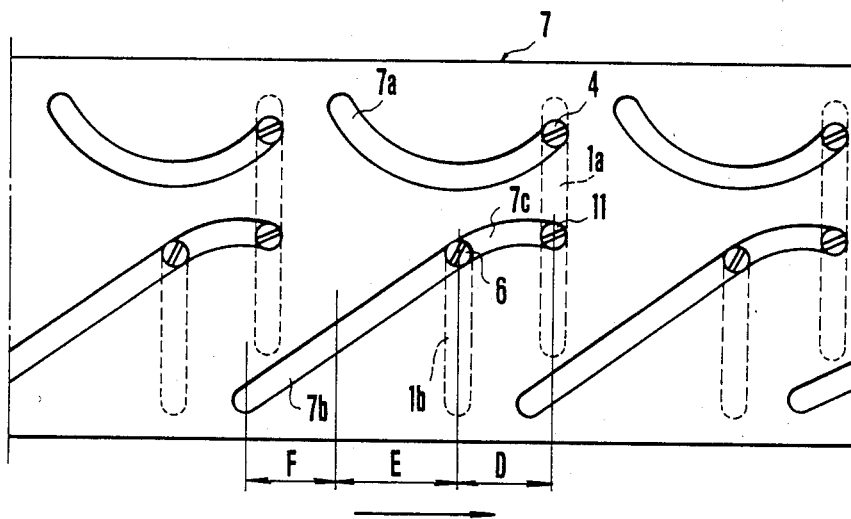
Figure 4:
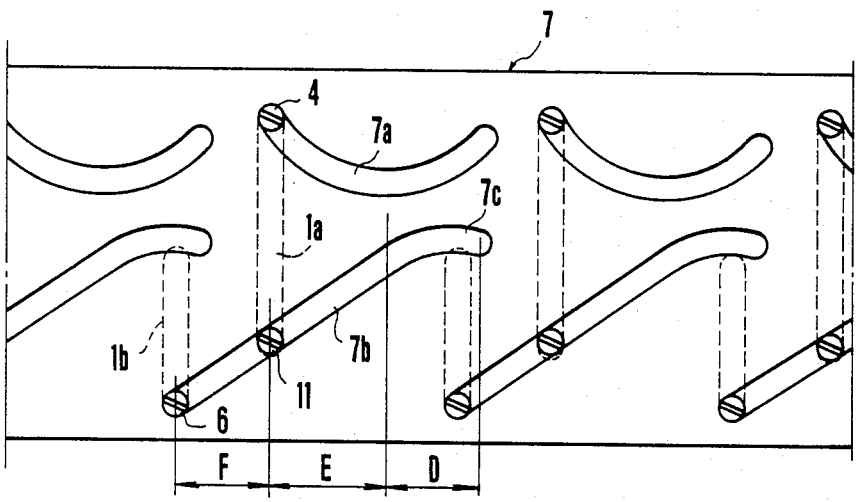
Figure 5:
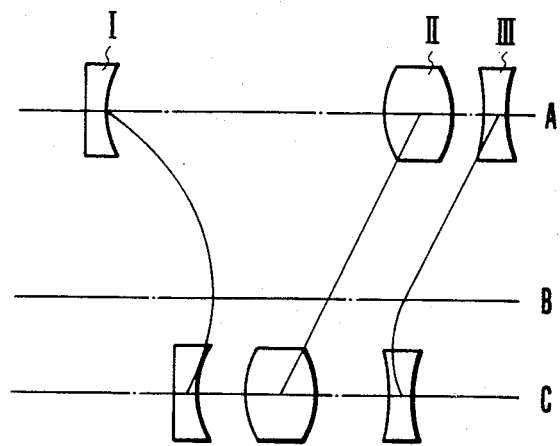
FIGS. 5 to 8 illustrate another embodiment of the present invention.
Figure 6:
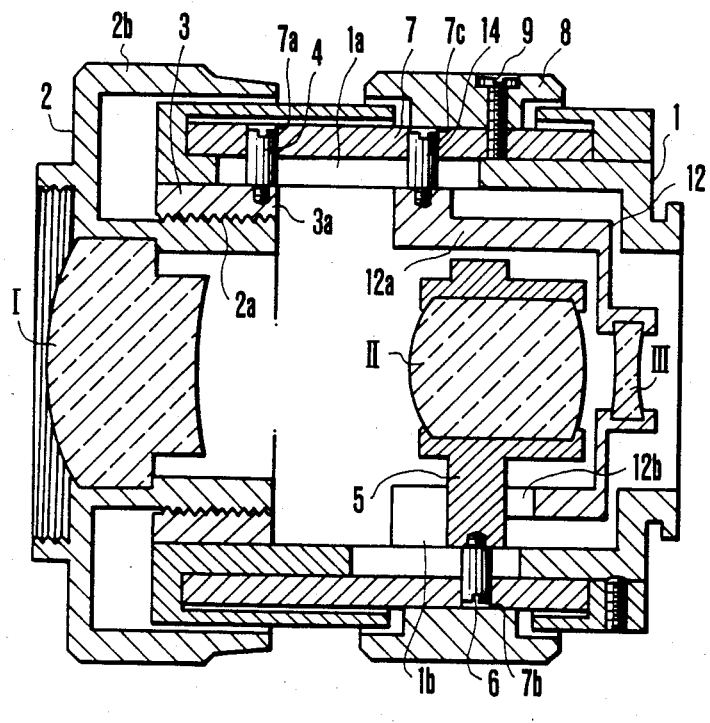

Also, FIGS. 3 and 4 are expanded views of the cam sleeve 7 where a 3-slot cam type is shown and what positions the guide pins 4, 6 and 11 take in relation to the camming slots 7a, 7b and 7c when in the telephoto and wide angle ends are shown in FIGS. 3 and 4 respectively. The camming slot 7b and the camming slot 7c as extending from that end of the camming slot 7b which is occupied by the guide pin 6 when in the telephoto end constitute a contiguous camming slot of which one third region D corresponding to the camming slot 7c is used only for the movable stop. The guide pin 11 of the movable stop sleeve 10 moves throughout regions D+E, while the guide pin 6 of the rear component moving ring 5 moves throughout regions E+F which correspond to the camming slot 7b. Therefore the region E is a common camming slot for the movable stop sleeve 10 and the rear component moving ring 5.

Next, the operation of the zoom lens mounting of such construction is described below.

When the zoom ring is turned, the cam sleeve 7 is turned as a unit therewith, whereby the front component moving ring 3 is axially moved through the guide pin 4 and the rear component moving ring 5 is axially moved through the guide pin 6 according to the respective camming slots 7a and 7b. Therefore the front lens component I and the rear lens component II are moved axially in differential relation.

In the meantime, the movable stop sleeve 10 is moved under the control of the guide pin 11 in such a manner that when in the telephoto end shown in FIG. 3, the guide pin 11 takes its place at the terminal end of the camming slot 7c for the movable stop provided in the extended portion of the rear lens component control camming slot 7b but, as the cam sleeve rotates in the direction of the arrow, the guide pin 11 after having moved the entire length of the camming slot 7c moves in the camming slot 7b, reaching a position at the boundary between the regions E and F of the camming slot 7b when in the wide angle end shown in FIG. 4.

Also when the focusing barrel 2 is turned by handling the actuator 2b thereof, the front lens component I is moved axially to effect focusing.

It should be noted that, although in the foregoing embodiment, as the guide slot 1a of the body tube 1 is commonly used by the guide pin 4 of the front component moving ring 3 and the guide pin 11 of the movable stop sleeve 10, a variation may be made such that the front component moving ring 3 and the movable stop sleeve 10 are axially moved by respective independent guide slots of each other in the body tube 1.

Further, though in the foregoing embodiment it is from the telephoto end of the rear component control camming slot 7b that the camming slot for the movable stop extends, the latter may be otherwise provided at either the wide angle end of the rear component control camming slot 7b, or the telephoto or the wide angle end of the front component control camming slot 7a.

As has been described above, according to the present invention, by providing an extended portion to the conventional zooming control camming slot of the zoom lens mounting, the stop is made movable with an advantage that the harmful light can be easily shut off over the entire zooming range and the optical performance can be improved.

FIGS. 5 to 8 illustrate another embodiment of the present invention applied to a moving mechanism for a zoom lens in the zoom lens mounting.

In the drawings, the same reference characters have been employed to denote the similar parts to those shown in the foregoing embodiment. This embodiment relates to a zoom lens mounting which moves three lens components I, II and III at a time according to the loci of movement shown in FIG. 5 to perform the zooming function.

12 is a lens holder sleeve holding the zoom lens III and fitted in the body tube 1. The lens holder sleeve 12 has an axially elongated portion 12a. The lens holder sleeve 5 for the second lens II penetrates an opening portion 12b formed in a portion of said elongated portion 12a.

14 is an engaging pin provided on the lens holder sleeve 12 and engaging at a cross point of the straight slot 1a and a camming slot 7c.

Figure 7:
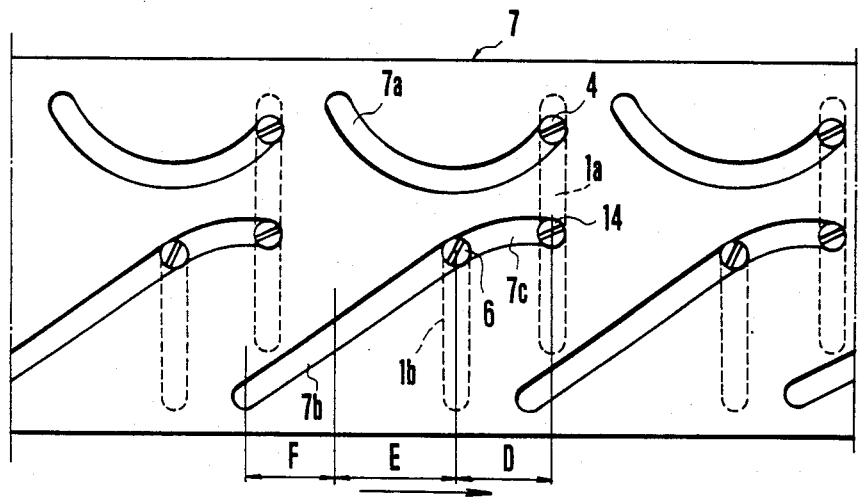
Figure 8:
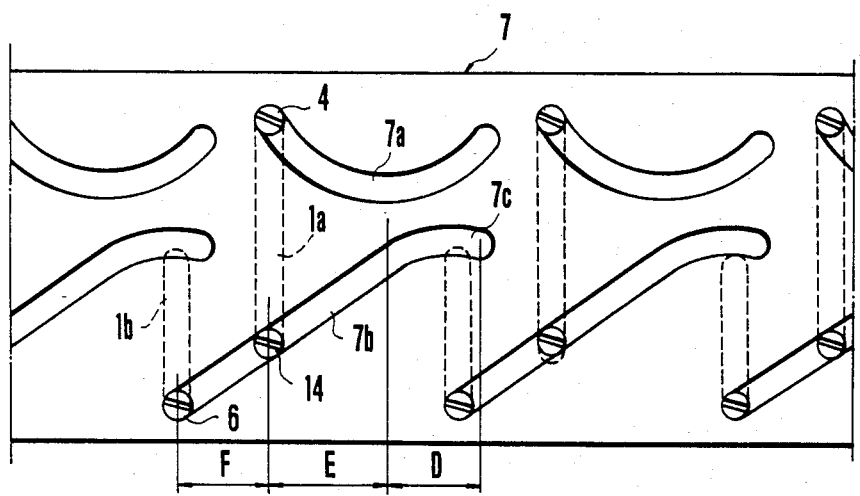

The camming slot 7c is formed on an extension of a camming slot 7b which shows a locus of movement of the second lens II as shown in FIGS. 7 and 8.

In the zoom lens mounting of the above-described construction, focusing is performed by moving the lens I by turning a focusing ring 2.

To perform zooming, a zoom ring 8 is turned, and thereby the cam sleeve 7 is turned. As the cam sleeve 7 turns, the lenses I, II and III change their relative positions according to the loci of movement shown in FIG. 5 with the result of changing the image magnification.

As zooming is performed, the second lens II moves across regions E and F according to the camming slot 7b of FIGS. 7 and 8, and the third lens III moves across region D according to the camming slot 7c. The intermediate region E is commonly used by the second and third lenses.

The present invention as has been described above makes use of a common portion of the camming slot for the second and third lenses thereby giving a great advantage when the interval between the adjacent two camming slots is narrow.

That is, to stabilize motion of the zoom components II and III and to prevent their optical axes from deviating from the common optical axis, it is desired to use as many camming slots as possible. As the number of camming slots in a common circumferential zone of the cam sleeve increases, however, the separation between the adjacent two camming slots becomes shorter, thereby causing a problem in that the strength of the cam sleeve is weakened.

If the present invention is employed, because a portion of each camming slot is in common use, the abovedescribed problem can be eliminated.

What is claimed is:

1. A zoom lens mounting comprising:
   (a) a first optical member having a focusing function and a zooming function and a first holder member;
   (b) a second optical member cooperating with said first optical member and a second holder member;
   (c) a body tube having first and second straight slots each elongated in a parallel direction to an optical axis;
   (d) a stop member arranged to move axially when zooming is performed;
   (e) a cam cyclinder,
   said cam cyclinder having first, second and third cam portions for controlling the movements of said first and second optical members and said stop member, said first and third cam portions crossing said first straight slot and said second cam portions crossing said second straight slot; and
   (f) cam follower means,
   said cam follower means having guide pins fixedly secured to said first and second optical members and said stop member,
   said guide pins including a first guide pin engaging at a cross point of the first straight slot and the first cam portion,
   a second guide pin engaging at a cross point of the second straight slot and the second cam portion, and
   a third guide pin engaging at a cross point of said first straight slot and the third cam portion.

2. A zoom lens mounting having a plurality of lens groups and lens holder members for holding said lens groups,
   a cam cylinder having at least two zoom control cam portions for controlling the zooming operation of said lens groups, and a body tube containing said lens holder members,
   said mounting comprising:
   (a) a stop member for controlling the incident light amount;
   (b) a stop control cam portion for controlling the amount of movement of said stop member,
   said cam portion being formed contiguously with one end of one of the zoom control cam portions of said cam cylinder; and
   (c) a cam follower by which said stop member follows up said stop cam portion.

3. A zoom lens mounting comprising:
   (a) a first optical member for performing a focusing function and a zooming function and a first holder member;
   (b) a second optical member and a second holder member;
   (c) a third optical member and a third holder member;
   (d) a body tube having first and second straight slots each elongated in a direction parallel to an optical axis;
   (e) a cam cylinder,
   said cam cylinder having a first cam portion for installing the amount of movement of said first optical member,
   second and third cam portions for controlling the amounts of movement of said second and third optical members,
   said second and third cam portions being formed contiguously with each other; and
   (f) cam follower means,
   said means having a first guide pin fixedly secured to said first holder member and engaging at a cross point of the first straight slot and the first cam portion;
   a second guide pin fixedly secured to the second holder member and engaging at a cross point of the second straight slot and the second cam portion; and
   a third guide pin fixedly secured to the third holder member and engaging at a cross point of the first straight slot and the third cam portion.

* * * * *